United States Patent [19]
Asada et al.

[11] Patent Number: 5,273,368
[45] Date of Patent: Dec. 28, 1993

[54] HYDRODYNAMIC GAS BEARING

[75] Inventors: Takafumi Asada, Hirakata; Hiroyuki Funasho, Neyagawa, both of Japan

[73] Assignee: Matsushita Electric Industrial Co., Ltd., Osaka, Japan

[21] Appl. No.: 791,222

[22] Filed: Nov. 13, 1991

[30] Foreign Application Priority Data

| Nov. 13, 1990 | [JP] | Japan | 2-307397 |
| Nov. 13, 1990 | [JP] | Japan | 2-307401 |
| Nov. 13, 1990 | [JP] | Japan | 2-307402 |

[51] Int. Cl.$^5$ .................................................. F16C 17/10
[52] U.S. Cl. ........................... 384/113; 384/292; 384/115
[58] Field of Search ............... 384/292, 291, 398, 373, 384/369, 115, 113

[56] References Cited
U.S. PATENT DOCUMENTS

| 5,018,881 | 5/1991 | Asada . | |
| 5,046,863 | 9/1991 | Sakatani et al. | 384/292 |
| 5,096,309 | 3/1992 | Nakasugi et al. | 384/292 |

FOREIGN PATENT DOCUMENTS
59-113314  6/1984  Japan .

*Primary Examiner*—Lenard A. Footland
*Attorney, Agent, or Firm*—Wenderoth, Lind & Ponack

[57] ABSTRACT

A hydrodynamic gas bearing includes a cantilevered shaft having a free end, a fixed end, and a communicating hole for communicating with a passage formed at an end surface of the free end of the shaft. A cover member is rotatably arranged around the shaft to cover a periphery of the shaft. One of an inner surface of the cover member which faces the fixed end of the shaft and an outer surface of the fixed end of the shaft has herringbone-configured hydrodynamic pressure generating grooves for preventing gas from being fed from a fixed end side to a free end side of the shaft. One of the inner surface of the cover member which faces the free end of the shaft and an outer surface of the free end of the shaft has helical-configured hydrodynamic pressure generating grooves for feeding gas from the free end side to the fixed end side of the shaft.

7 Claims, 8 Drawing Sheets

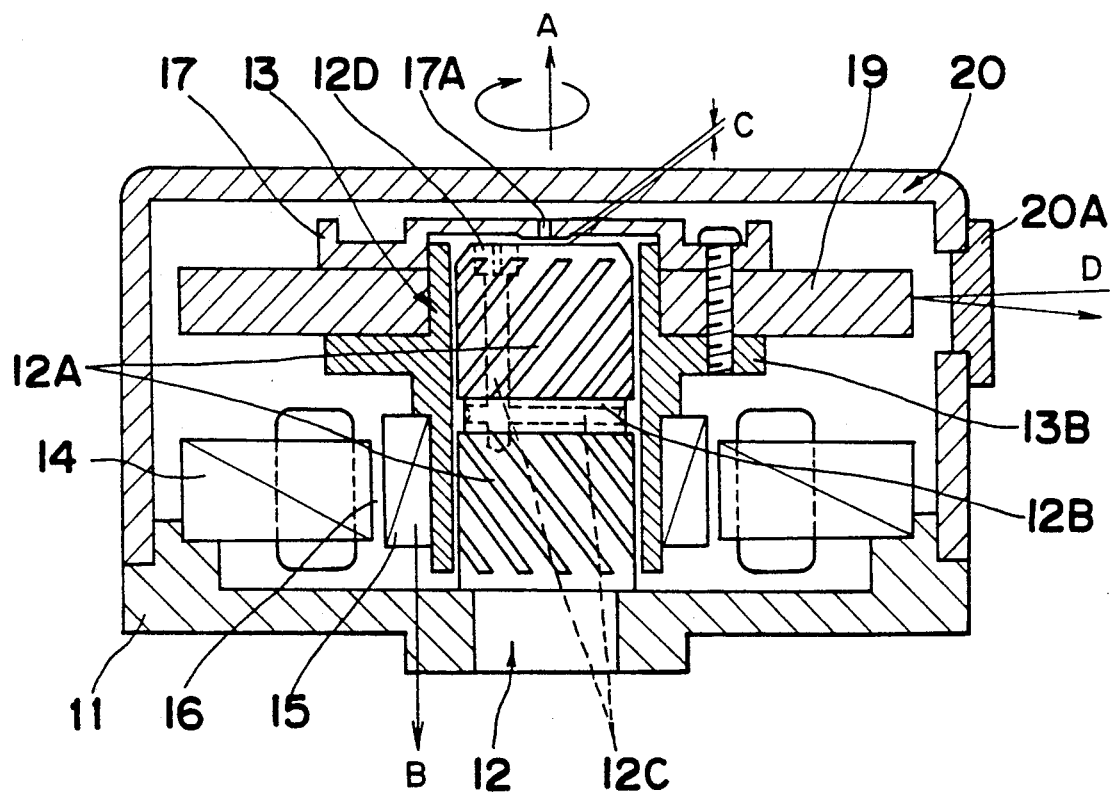
Fig. 7 - PRIOR ART

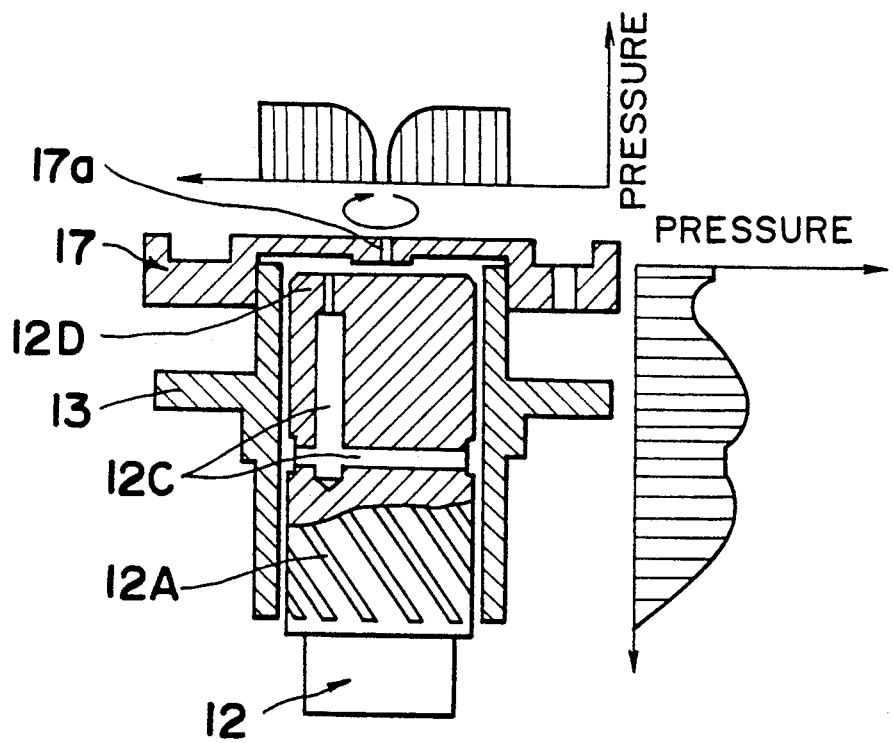
Fig. 8 - PRIOR ART

HYDRODYNAMIC GAS BEARING

BACKGROUND OF THE INVENTION

The present invention relates to a hydrodynamic gas bearing, provided for the main shaft of a polygon mirror scanner or the like, for floating a sleeve relative to a shaft to constitute a radial bearing and a thrust bearing by pressure generated in dynamic pressure generating grooves provided in the radial bearing, and more particularly to a hydrodynamic gas bearing which generates no whirls or self-excited vibrations and provides stable rotation.

FIGS. 7 and 8 show an example of a conventional hydrodynamic gas bearing applied to a polygon mirror scanner.

Referring to FIG. 7 which is a sectional view showing the conventional hydrodynamic gas bearing, the lower end of a shaft 12 is fixed to the center portion of a main body 11 of the bearing. There are provided in the periphery of the shaft 12 a pair of dynamic pressure generating herringbone-configured hydrodynamic pressure generating grooves 12A. A peripheral groove 12B is provided in the region, between the herringbone-configured hydrodynamic pressure generating grooves 12A, in which a high pressure is generated. There are provided in the shaft 12 a communicating hole 12C and a throttling hole 12D for feeding pressurized gas under pressure from the peripheral groove 12B to the end surface of the free end of the shaft 12. There is provided a rotatable lid 17 positioned on the free end of the shaft 12. A flange 13B for mounting a polygon mirror 19 to a sleeve 13 is provided in the vicinity of the upper end of the sleeve 13. The lid 17 serves as a means for fixing the polygon mirror 19 to the main body 11 by a bolt. A rotor magnet 15 is mounted on the sleeve 13 and a stator 14 is fixed to the main body 11. The stator 14 and the rotor magnet 15 constitute a motor 16. A protective dust cover 20 having a glass 20A is fixed to the main body 11.

The operation of the hydrodynamic gas bearing of the above-described construction is described below with reference to FIGS. 7 and 8. Referring to FIG. 7, upon energizing of the stator 14 of the motor 16, the rotor magnet 15 is rotated. While the lid 17 and the polygon mirror 19 rotate together with the sleeve 13 at a speed as high as, for example, 30,000 r.p.m., laser beams are incident on the polygon mirror 19 as shown by the arrow (D) and reflected thereby. During rotation of the sleeve 13, the sleeve 13 rotates at high speed with a gas pressure increasing between the herringbone-configured hydrodynamic pressure generating groove 12A and the sleeve 13 due to a pumping action of the herringbone-configured hydrodynamic pressure generating grooves 12A. A part of the gas thus pressurized is introduced from the peripheral groove 12B to the free end of the shaft 12 via the communicating hole 12 and is then blown out toward the lid 17 through the throttling hole 12D consisting of a slit. Thus, a force for floating the sleeve 13 relative to the shaft 12 in the direction shown by the arrow (A) is generated. The weight of the sleeve 13, the mirror 19, and the lid 17 and the force of the magnet 15 for attracting the stator 14 act in the direction shown by the arrow (B). As a result, the forces acting in the direction shown by the arrows (A) and (B) balance each other. Thus, the sleeve 13 floats in an amount shown by the arrow (C). FIG. 8 shows the distribution of the gas pressure in the radial direction generated by the herringbone-configured hydrodynamic pressure generating grooves 12A and that of the pressure in the thrust direction generated by the blow-out of the gas from the communicating hole 12C. The protective cover 20 and the glass 20A prevent dust from penetrating into the bearing and dew from being formed on the polygon mirror 19.

However, the above construction has the following disadvantages: The gas pressure in the vicinity of the fixed end of the shaft 12 does not increase sufficiently and thus the fixed end of the shaft 12 seizes and a whirl or a self-excited vibration is generated, which may lead to an unstable rotation of the bearing. Particularly, the communication of the herringbone-configured hydrodynamic pressure generating grooves 12A with the peripheral groove 12B or the communicating hole 12C reduces pressure of the gas and generates the whirl to a great extent.

SUMMARY OF THE INVENTION

It is therefore an essential object of the present invention to provide a hydrodynamic gas bearing capable of preventing whirls or self-excited vibrations from occurring, such that it will provide for stable rotation.

In accomplishing these and other objects, according to one aspect of the present invention, there is provided a hydrodynamic gas bearing comprising: a cantilevered shaft having a free end, a fixed end, and a communicating hole for communicating with a passage formed at an end surface of the free end of the shaft; and a cover member rotatably arranged around the shaft to cover a periphery of the shaft. One of an inner surface of the cover member which faces the fixed end of the shaft and an outer surface of the fixed end of the shaft has herringbone-configured hydrodynamic pressure generating grooves for preventing gas from being fed from a fixed end side to a free end side of the shaft. One of the inner surface of the cover member which faces the free end of the shaft and an outer surface of the free end of the shaft has helical-configured hydrodynamic pressure generating grooves for feeding gas from the free end side to the fixed end side of the shaft.

BRIEF DESCRIPTION OF THE INVENTION

These and other objects and features of the present invention will become apparent from the following description taken in conjunction with preferred embodiments thereof with reference to the accompanying drawings, throughout which like parts are designated by like reference numerals, and in which:

FIG. 7 is a sectional view showing a conventional hydrodynamic gas bearing; and

FIG. 8 is a descriptive view showing a pressure generated in the bearing of FIG. 7.

DETAILED DESCRIPTION OF THE INVENTION

Figure 1:
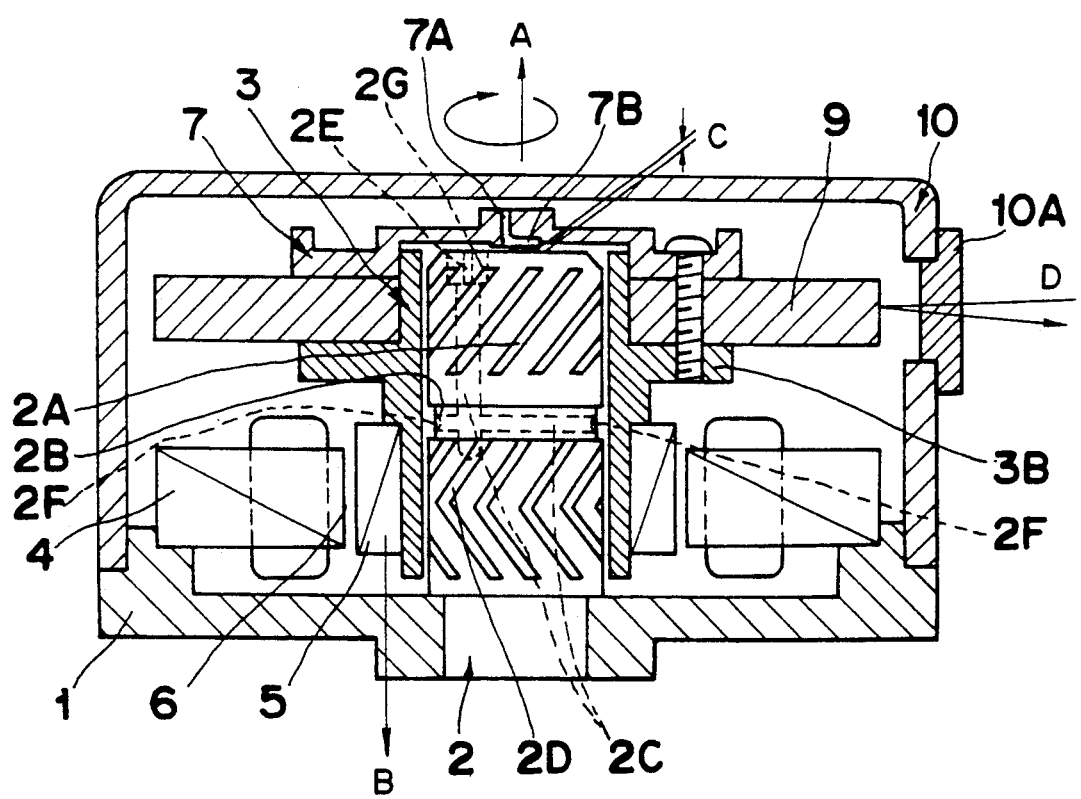
FIG. 1 is a sectional view showing a hydrodynamic gas bearing according to an embodiment of the present invention.

Before the description of the present invention proceeds, it is to be noted that like parts are designated by like reference numerals throughout the accompanying drawings.

Figure 2:
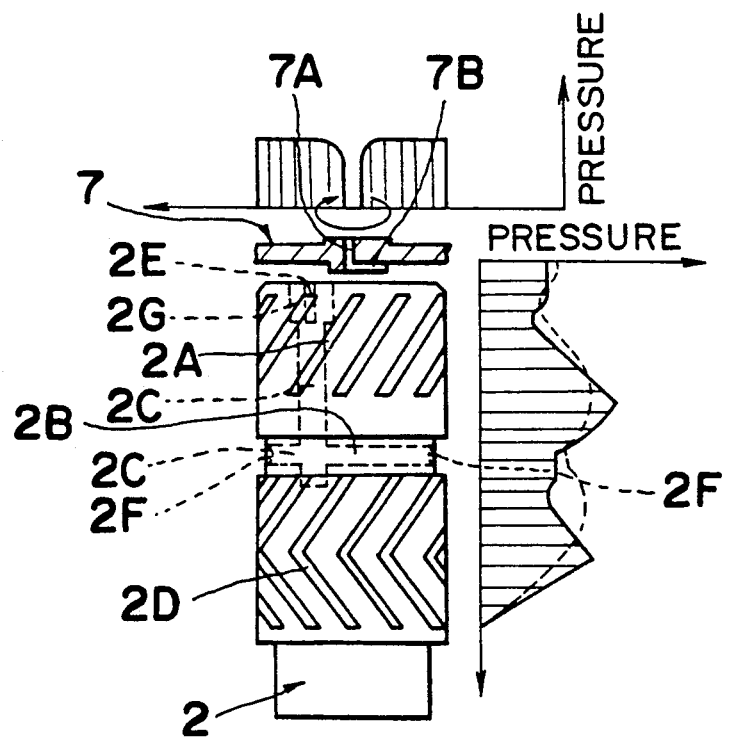
FIG. 2 is a descriptive view showing a pressure generated in the bearing of FIG. 1.
Figure 3:
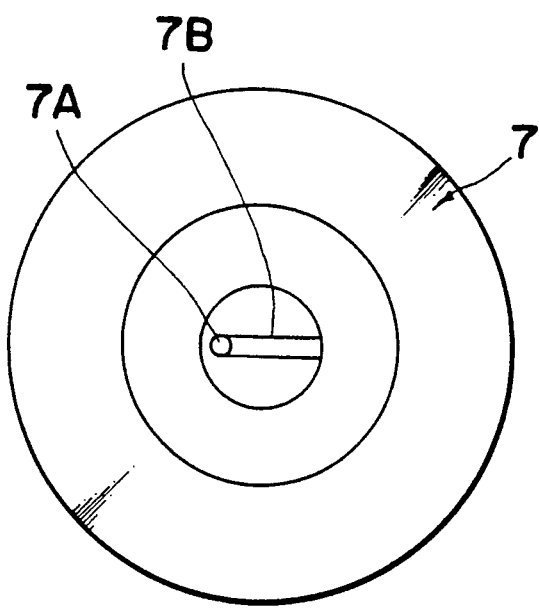
FIG. 3 is a bottom view of the lid of the bearing.
Figure 4:
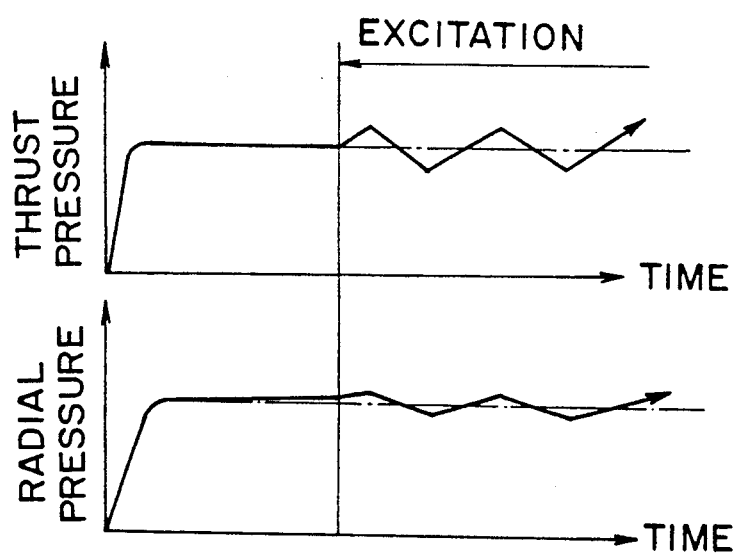
FIG. 4 is a graph showing pressure changes in the thrust and radial directions of the bearing.

Referring to FIGS. 1 and 2, a hydrodynamic gas bearing according to an embodiment of the present invention is described below. In this embodiment, the bearing is applied to a polygon scanner. Referring to FIG. 1, the lower end portion of a shaft 2 is fixed to the center portion of the main body 1 of the bearing. There are provided in the periphery of the shaft 2 a helical-configured hydrodynamic pressure generating grooves (referred to as helical groove hereinafter) 2A for feeding gas to the fixed end side of the shaft 2 and a herringbone-configured hydrodynamic pressure generating grooves (referred to as herringbone grooves hereinafter) 2D having an approximately symmetrical configuration as shown in FIG. 1. More specifically, the grooves 2A are positioned on the outer surface of the free end of the shaft 2 and the groove 2D are positioned on the outer surface of the fixed end of the shaft 2. There are provided, between the helical and herringbone grooves 2A and 2D, a peripheral groove 2B having opposing holes 2F opening into a communicating hole (or passage) 2C. The communicating hole 2C is so formed that the opposing holes 2F formed in the peripheral groove 2B and a throttling hole 2E formed in the end surface of the free end of the shaft 2 are communicated with each other through the communicating hole 2C, so that pressurized gas is fed from the opposing holes 2F formed in the peripheral groove 2B to the throttling hole 2E formed in the end surface of the free end of the shaft 2 through the communicating hole 2C. The throttling hole 2E is so formed that a cylinder tube 2G having a narrow passage is closely fitted in a large hole formed at the upper end portion of the communicating hole 2C. A cover member is comprised of a rotatable sleeve 3 and a lid 7 provided on the free end side of the shaft 2. The sleeve 3 is provided around the shaft 2 to rotate around the shaft 2. The lid 7 has a through hole 7A and a groove 7B for communicating with the through hole 7A at the inner surface of the lid 7 which faces the end surface of the free end of the shaft 2 as shown in FIG. 3. When the sleeve 3 is rotating at the high speed and large vibration are applied to the bearing in the thrust direction, the lid 7 and the sleeve are vibrated in the thrust direction. However, even if the end surface of the free end of the shaft 2 contacts the inner surface of the lid 7, the through hole 7A of the lid 7 is not closed by the end surface of the free end of the shaft 2 because the groove 7B communicating with the through hole 7A cannot be closed by the end surface of the shaft 2. As a result, as shown in FIG. 4, the gas pressure change in the thrust direction is relatively small and the gas pressure in the radial direction is hardly changed. Thus, the sleeve 3 stably rotates without radial pressure change even when thrust vibrations are applied to the bearing. The sleeve 3 has at its middle portion a flange 3B for fixing a polygon mirror 9 to the main body 1 by holding the mirror 9 between the flange 3B and the lid 7. The lid 7 serves as a means for fixing the polygon mirror 9 to the main body 1 by a bolt. A rotor magnet 5 is mounted on the sleeve 3. A stator 4 corresponding to the magnet 5 is fixed to the main body 1. The stator 4 and the rotor magnet 5 constitute a motor 6. A protective dust cover 10 having a glass 10A is attached to the main body 1.

The operation of the hydrodynamic gas bearing of the above-described construction is described below with reference to FIGS. 1 and 2. Referring to FIG. 1, upon energizing of the stator 4 of the motor 6, the magnet 5 is rotated. While the lid 7 and the polygon mirror 9 rotate together with the sleeve 3 at a speed as high as, for example, 30,000 r.p.m., laser beams are incident on the polygon mirror 9 as shown by the arrow (D) in FIG. 1 and reflected thereby. During the rotation of the lid 7, the polygon mirror 9, and the sleeve 3, the sleeve 3 rotates at the high speed with a gas pressure increasing between the shaft 2 and the sleeve 3 due to a pumping action caused by the helical groove. 2A and the herringbone grooves 2D. As a result, the sleeve 3 rotates around the shaft 2 without contact of the shaft 2 with the sleeve 3. The pressurized gas fed from the free end side of the shaft 2 to the fixed end side thereof by means of the helical groove 2A is introduced to the free end of the shaft 2 from the opposing holes 2F of the peripheral groove 2B through the communicating hole 2C, and is then blown out toward the lid 7 through the throttling hole 2E. As a result, the pressure between the end surface of the free end of the shaft 2 and the sleeve 3 is increased and a part of the pressurized air escapes through the throttling passage 7A so that the pressure is decreased to maintain a constant pressure value. Thus, an approximately constant force is generated for floating the sleeve 3 in the direction shown by the arrow (A) in FIG. 1. The weight of the rotary body, that is, the sleeve 3, the polygon mirror 9, and the lid 7 and the force of the magnet 5 for attracting the stator 4 act in the direction shown by the arrow (B) in FIG. 1. The forces acting in the directions shown by the arrows (A) and (B) balance each other. Thus, the sleeve 3 floats in an amount shown by the arrow (C) in FIG. 1. FIG. 2 shows the distribution of the gas pressure in the radial direction generated by the helical grooves 2A and the herringbone grooves 2D and that of the gas pressure in the thrust direction generated by the blow-out from the throttling hole 2E. In FIG. 2, the distribution is shown by solid lines and the distribution of the gas pressure in the radial direction generated by the two helical grooves 12A in the conventional bearing shown in FIGS. 7 and 8 is shown by the dotted line. As a result, the gas pressure in the radial direction generated by the helical grooves 2A and the herringbone groove 2D is sufficiently higher than that in the conventional bearing, especially in the vicinity of the fixed end of the shaft 2. The protective cover 10 and the glass 10A prevent dust from penetrating into the bearing and dew from being formed on the polygon mirror 9.

As apparent from the forgoing description, since gas pressure is increased greatly by the action of the helical grooves 2A and the herringbone grooves 2D, whirls and self-excited vibrations do not occur during rotation of the sleeve 3, the mirror 9, and the lid 7 and, thus, the above members 3, 9, and 7 rotate stably. Particularly, since each maximum pressure of the gas pressure distribution is sufficiently high, the bearing operates reliably.

Even when the helical grooves 2A and/or the herringbone grooves 2D are formed in the inner periphery of the sleeve 3, effects similar to the above can be obtained and the gas pressure increases in a similar manner. Additionally, the groove 7B can be formed on the end surface of the free end of the shaft 2 to communicate with the through hole 7A of the lid 7.

Figure 5:
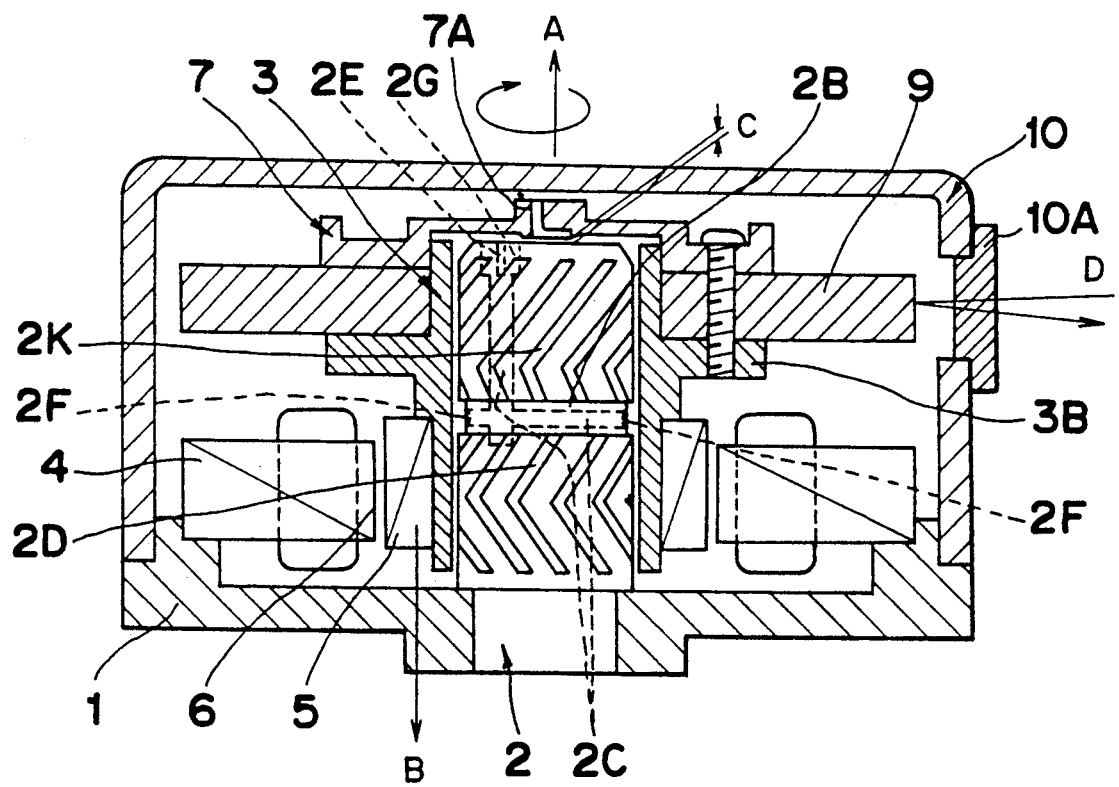
FIG. 5 is a sectional view showing a hydrodynamic gas bearing according to another embodiment of the present invention.
Figure 6:
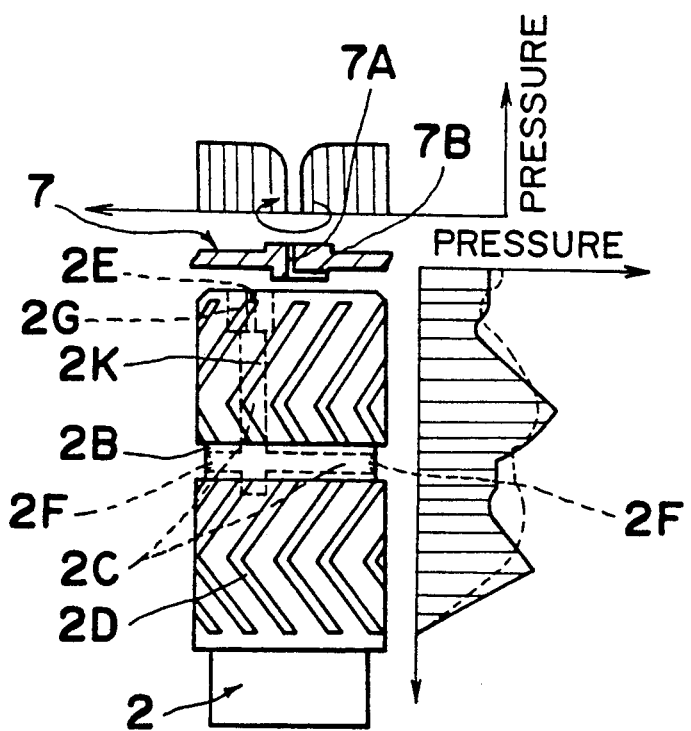
FIG. 6 is a descriptive view showing a pressure generated in the bearing of FIG. 5.

Referring to FIGS. 5 and 6, a hydrodynamic gas bearing according to another embodiment of the present invention is described below. In this embodiment, the bearing is also applied to a polygon scanner. Referring to FIG. 6, the lower end portion of the shaft 2 is fixed to the center portion of the main body 1 of the bearing. There are provided in the periphery of the shaft 2 first and second herringbone grooves (referred to as herringbone grooves hereinafter) 2K and 2D. The first herringbone grooves 2K are positioned on the periphery of the free end of the shaft 2 and have an asymmetrical configuration so that the grooves 2K feed gas from the free end side to the fixed end side of the shaft 2. The second herringbone grooves 2D are positioned on the periphery of the fixed end of the shaft 2 and have an approximately symmetrical configuration so that the grooves 2D prevents gas from being fed from the fixed end side to the free end side of the shaft 2. In this embodiment, the above-described effect can be obtained.

As apparent from the foregoing descriptions of the embodiments of the present invention, high pressure is generated by the pumping operation of the helical and herringbone grooves 2A and 2D or the herringbone grooves 2K and 2D. Therefore, whirls and self-excited vibrations do not occur and the sleeve rotates stably.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A hydrodynamic gas bearing comprising:
    a cantilevered shaft having a free end, a fixed end, a free end outer peripheral surface, a fixed end outer peripheral surface, and a communicating passage opening through an end surface of said free end of said shaft;
    a cover member rotatably arranged around said shaft to cover a periphery of said shaft;
    wherein a first herringbone-configured hydrodynamic pressure generating groove is formed in one of said fixed end outer peripheral surface and a portion of an inner surface of said cover member facing said fixed end outer peripheral surface for feeding gas between said cover member and said free end outer peripheral surface of said shaft toward said fixed end of said shaft;
    wherein a second herringbone-configured hydrodynamic pressure generating groove is formed in one of said free end outer peripheral surface of said shaft and a portion of said inner surface of said cover member facing said free end outer peripheral surface for preventing gas from being fed from said free end toward said fixed end of said shaft; and
    wherein a through hole is formed in a portion of said cover member facing said end surface of said free end of said shaft, and a communication groove is formed in one of said end surface of said free end of said shaft and said portion of said inner surface of said cover member facing said end surface of said free end of said shaft, such that said communication groove communicates with said through hole.

2. The hydrodynamic gas bearing as claimed in claim 1, wherein
    said second herringbone-configured hydrodynamic pressure generating groove has an approximately symmetrical configuration along an axial direction of said shaft.

3. The hydrodynamic gas bearing as claimed in claim 1, wherein
    said first herringbone-configured hydrodynamic pressure generating groove has an asymmetrical configuration along an axial direction of said shaft.

4. The hydrodynamic gas bearing as claimed in claim 1, wherein
    a peripheral groove is formed in said shaft at a portion thereof between said first and second herringbone-configured hydrodynamic pressure generating grooves.

5. The hydrodynamic gas bearing as claimed in claim 1, wherein
    said communication groove is formed so as to define a means for maintaining communication between said through hole and an interior of said cover member even if said end surface of said free end of said shaft is in contact with said portion of said cover member facing said end surface of said free end of said shaft.

6. The hydrodynamic gas bearing as claimed in claim 5, wherein
    said cover member includes, at said portion of said inner surface thereof facing said end surface of said free end of said shaft, an inwardly protruding portion protruding inwardly toward said shaft and having a radially outwardly facing side surface;
    said through hole opens through said inwardly protruding portion; and
    said communication groove is formed in said inwardly protruding portion and opens inwardly toward said end surface of said free end of said shaft and through said radially outwardly facing side surface of said inwardly protruding portion.

7. The hydrodynamic gas bearing as claimed in claim 1, wherein
    said cover member includes, at said portion of said inner surface thereof facing said end surface of said free end of said shaft, an inwardly protruding portion protruding inwardly toward said shaft and having a radially outwardly facing side surface;
    said through hole opens through said inwardly protruding portion; and
    said communication groove is formed in said inwardly protruding portion and opens inwardly toward said end surface of said free end of said shaft and through said radially outwardly facing side surface of said inwardly protruding portion.

* * * * *